Patented Aug. 1, 1939

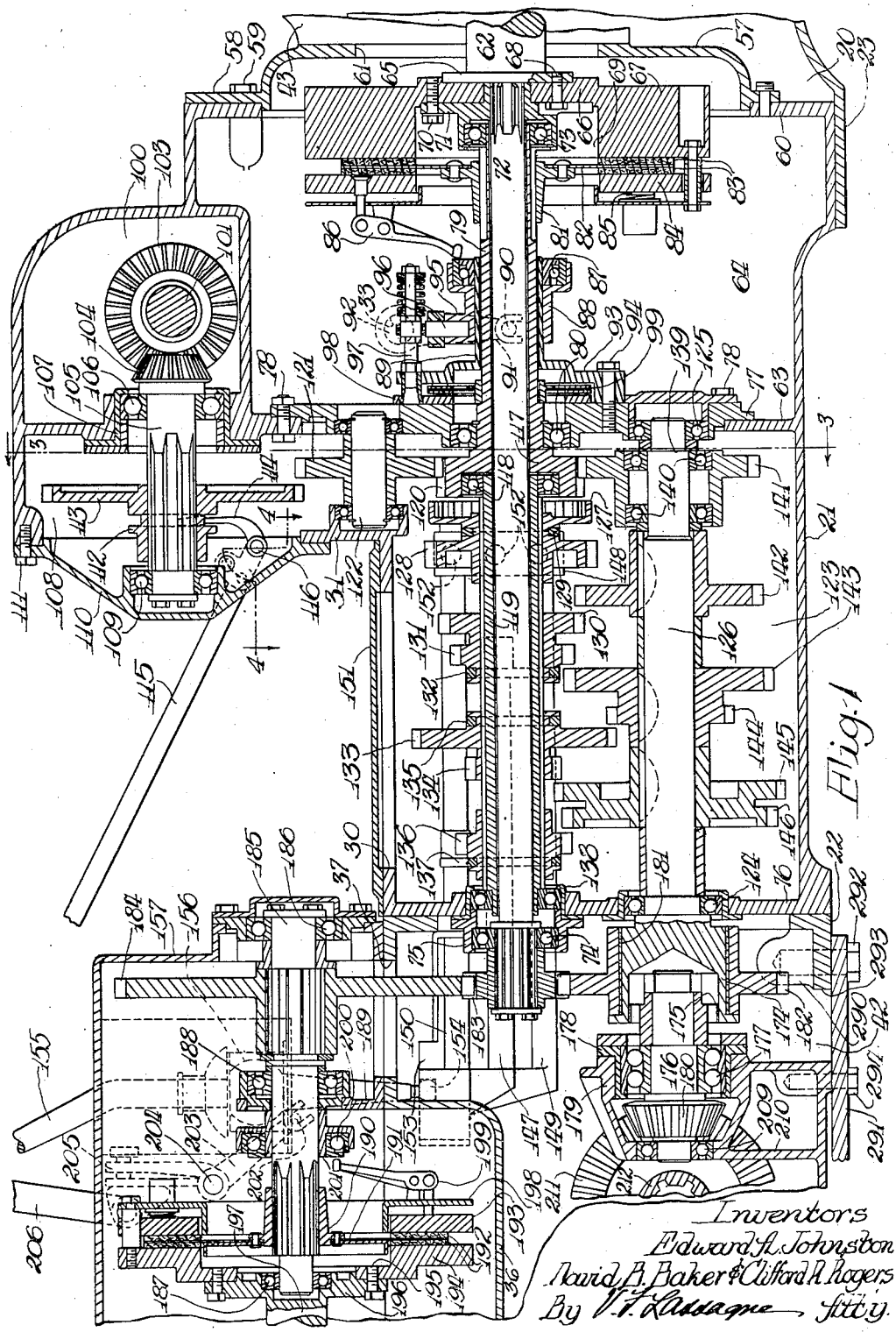

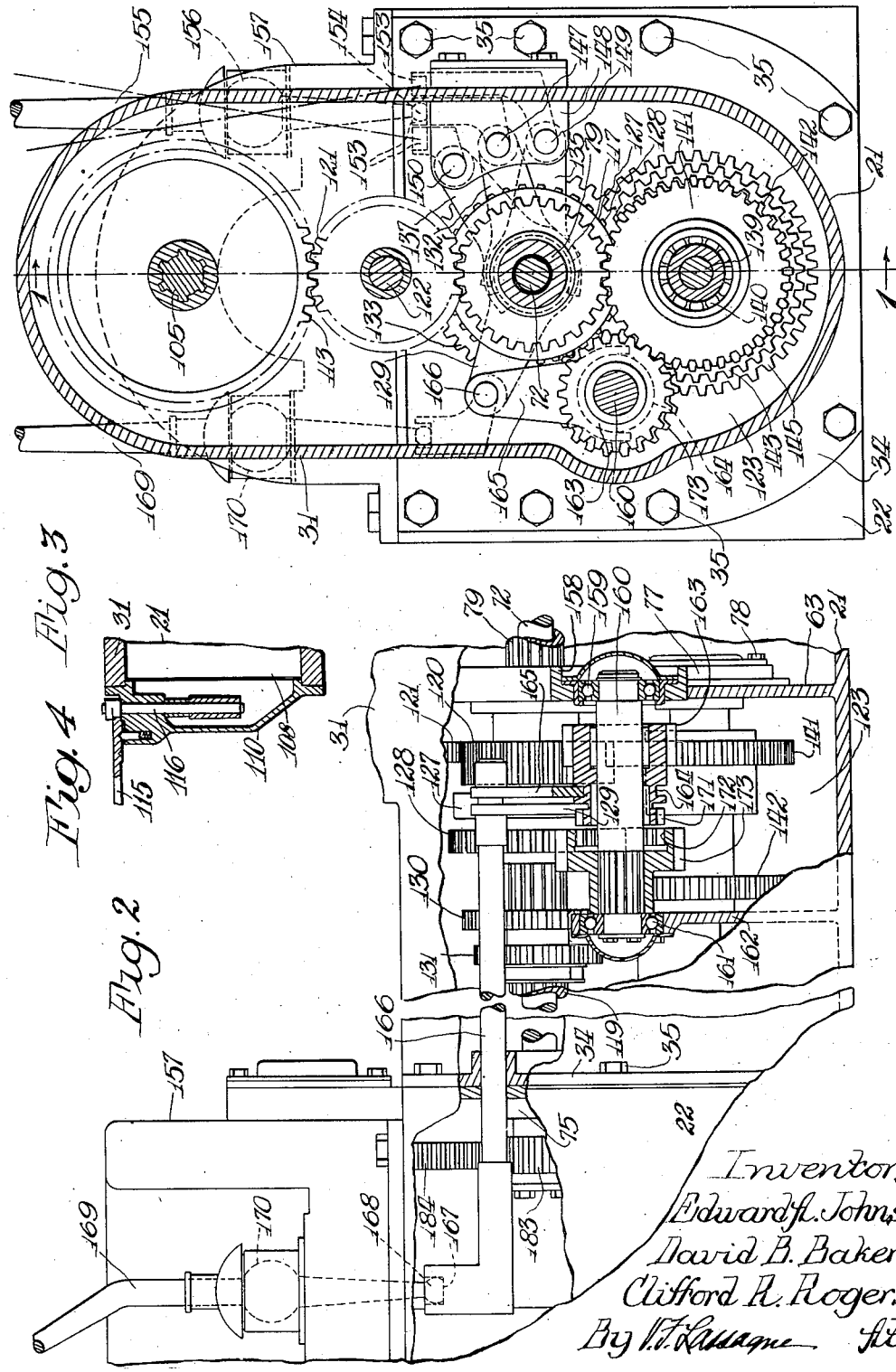

2,168,033

UNITED STATES PATENT OFFICE 2,168,033

TRANSMISSION GEARING AND POWER TAKE-OFF

Edward A. Johnston, Chicago, David B. Baker, Riverside, and Clifford R. Rogers, Oak Park, Ill., assignors to International Harvester Company, Chicago, Ill., a corporation of New Jersey Original application July 5, 1935, Serial No. 29,798. Divided and this application July 25, 1936, Serial No. 93,014

9 Claims. (Cl. 74—326)

The invention relates to gearing for use in tractors and other automotive vehicles, this application being a division of co-pending application Serial Number 29,798 filed July 5, 1935, for Tractors.

The present application more particularly relates to an improved change speed gear transmission and a power take-off shaft.

It is also very desirable that tractors have a variable speed transmission, which will permit a wide range of speeds, so that the tractor may fit all conditions of use.

It is also desirable to provide a power take-off shaft associated with such transmission in such a manner that it will run continuously when the motor is running, even though the tractor be standing still, to permit operation of auxiliary implements and machinery.

The main object is to provide an improved change speed gear transmission, which will afford the tractor a relatively wide range of speed in traversing the ground.

Another important object is to provide a novel form of continuously operative power take-off shaft for driving implements or machines pulled by the tractor or associated therewith, said power take-off shaft turning at all times when the motor is in operation.

Still another object of the invention is to provide such transmission and power take-off structure in which the various parts thereof are easily accessible for repair and inspection.

Other important objects will, of course, become apparent to those skilled in this art as the disclosure is more fully made.

Briefly, these desirable objects are attained in a tractor, or the like, having a frame, which frame, at its front end, carries the motor. The middle part of the frame, with which this application is concerned, rearwardly of the motor houses the improved variable change speed gear set, providing a wide range of speeds of travel for the tractor. Associated with this middle part of the body and above the change speed gearing is a pulley take-off shaft. Associated with the flywheel of the engine and compactly built into the change speed transmission is a continuously rotating shaft, which is geared to drive a power take-off shaft including a clutch for controlling the same, arranged in a housing over the rear part of the frame just in back of the change speed gear set.

The improved structure is shown for the sake of illustration in its preferred embodiment in the accompanying sheets of drawings, wherein:

Figure 1 is a general, vertical, central, longitudinal, sectional view, showing the improved change speed transmission from the engine clutch to the first cross shaft of the final drive gearing, said view also showing the pulley take-off shaft and gearing, as well as the improved continuous power take-off shaft associated therewith, as seen along the section line 1—1 of Figure 3;

Figure 2 is a similar sectional view of the change speed gear transmission, looking from the opposite direction, to show the reverse shaft;

Figure 3 is a vertical cross sectional view, looking at the front of the change speed gear set, taken from the line 3—3 of Figure 1, looking in the direction of the arrows;

Figure 4 is a detail sectional view, showing the manner of mounting the control lever for the clutch to regulate operation of the pulley take-off shaft, taken along the line 4—4 shown in Figure 1, looking in the direction of the arrows.

The front part of the vehicle frame comprises a front bracket 20 carrying a motor of the internal combustion engine type, the rear end of the crank shaft 62 only of which is shown. Rearwardly of the bracket 20 is the transmission box part 21 of the frame. The rear end of the bracket 20 is formed as a circular saddle 23, into which the front end of the box 21 fits with the overlapped portions of these frame parts 20, 21 being securely and rigidly connected together. At the rear of the intermediate housing 21 is a communicating final drive housing or box 22.

The middle unit 21 is formed as a cast, generally rectangularly shaped box, closed at its bottom, the rear upper portion thereof being flat and having formed therein a large opening 30, while the forward portion of the box 21 is extended upwardly, as at 31, to provide an auxiliary compartment for a pulley take-off, said upward extension 31 having aligned side openings formed therein for the purpose of carrying a pulley shaft 101. One wall of the part 21 below and to the right of the upward extension 31, as seen in Figure 1, carries a transverse boss 33, which is bored to receive and journal a transverse rock-shaft 92 used for releasing the collar that controls an engine clutch. The top of the part 21 surrounding the opening 30 is enclosed by a cover plate 151 secured to the part 21 in any suitable manner. The rear transverse wall of the part 21 is extended laterally to form a flange 34 to receive bolts 35 for connecting the part 21 to the rear or final drive housing 22.

The top of this rear box 22 has a portion closed by a depressed cover 36, and forwardly thereof the box top is formed with a large opening 37, the cover 36 and opening 37 being surrounded by a machined edge formed with bolt holes, so that a cover housing 157 may be bolted in place over the cover 36 and opening 37. This cover housing encloses a power take-off shaft assembly with the cover 36 forming a tight bottom or floor therefor.

The front wall of the part 21 is open to afford communication with the rear portion of the front motor carrying bracket piece 20, and the rear end of the middle box part 21 is open to afford communication with the front open end of the rear box part 22, so that the various units arranged in the three different frame parts may be operatively connected together. From this it can now be seen that a sturdy, three-piece main frame is afforded when the three parts are rigidly bolted together to provide a strong frame or backbone for the tractor.

The rear end of the motor includes the usual bell housing plate 57, as shown in Figure 1, which bell housing plate includes a bolt circle 58 adapted to receive bolts 59 for securing said bell housing plate 57 of the motor to a bolt circle 60 formed as the front end of the middle frame unit 21. This bell housing plate 57 is formed with an opening 61, through which is projected the crank shaft 62 of the engine.

As shown in Figure 1, the part 21 has the bolt circle 60 at its front end and rearwardly thereof is a wall 63 to delineate an engine clutch compartment 64, which is dry. The rear end of the engine crank shaft 62, as shown in Figure 1, is formed with an upset flange 65 fitted into the recessed hub 66 of the engine flywheel 67, said flange 65 being secured by bolts 68 to said recessed hub 66, as shown. The rear face of the flywheel is hollow, as shown at 69, and to the rear face of the flywheel in this hollowed-out portion 69 is secured, by means of bolts 70, a plate 71, which is in the form of a sleeve splined to the front end of a main driving or transmission shaft 72, said sleeve plate 71 enclosing a bearing 73 for a purpose to appear later.

The rear end of this main transmission shaft 72 is carried in a bearing 74 mounted in a sleeve 75 fixed in the rear wall 76 of the middle transmission box part 21, said shaft also passing through a plate 77 secured by bolts 78 to the circular flange 63. This flange 63 with the plate 77 forms a rear wall for the engine clutch compartment 64.

As shown in Figure 1, a quill or sleeve shaft 79 is mounted for independent rotative movement on the said main transmission shaft 72. The rear end of said quill 79 is carried on a bearing 80 mounted in the plate 77. The front end of the quill 79 is journaled in the bearing 73 in the plate 71 carried by the flywheel; and rearwardly of the bearing 73, the quill 79 has splined thereto the hub 81 of a one-plate disk clutch 82 having on opposite faces thereof friction material linings 83. A clutch pressure plate 84 is carried in the usual way behind the clutch disk 82 and is normally pressed toward the clutch plate by the usual springs 85, only one of which is shown, to press the friction linings of the clutch plate 82 against the rear face of the motor flywheel 67. Associated with the pressure plate 84 are the usual clutch release levers 86, only one of which is shown, the inner ends of said levers in the usual way engaging the clutch release bearing 87 carried in a clutch release collar 88 slidably mounted on a sleeve 89 positioned on the quill 79.

This collar 88 carries the usual trunnions 90 operable by a lever 91 from a rockshaft 92 journaled in the bored boss 33 on the left hand wall of the clutch compartment. When the shaft 92 is rocked by a conventional control, the lever 91 swings to move the collar 88 and its bearing 87 forwardly to pivot the levers 86, and thereby to pull the clutch pressure plate 84 rearwardly against the pressure of the springs 85, and in this manner, which is conventional, to release the clutch 82 from engagement with the flywheel 67. In this fashion, power transmitted from the engine crank shaft 62 through the flywheel 67 is released from turning the quill 79.

The sleeve 89 includes a stationary plate or flange 93 secured by a circle of bolts 94 rigidly to the plate 77. The clutch release collar 88 carries an upstanding boss 95, in which is carried a vertical shaft 96 having connection with a rod 97, the rear end of said rod being anchored in a pressure plate 98 normally loosely abutting the front face of the wall plate 77. The plates 98 and 93 are normally spaced apart, and carried there-between is a one-plate friction lined brake disk 99, having its hub keyed on the quill 79.

It can now be seen that, when the main engine clutch 82 is released by forward movement of the collar 88, said collar moves forward with it the boss 95 to pull the rod 97 forwardly to pull the brake pressure plate 98 with it, frictionally to engage the brake disk 99 against the plate 93. Thus, when the engine clutch is released, the brake 99 is automatically applied to stop rotation of the change speed gear parts hereafter to be described.

The upper part of the clutch compartment 64 is formed with a small compartment 100 having a tight bottom and carrying the transverse shaft 101, which projects out of the compartment 100 to carry a pulley wheel, not shown. This shaft 101 carries a large bevel gear 103 driven from a bevel pinion 104. The pinion 104 is fast on a shaft 105 journaled in a bearing 106 carried in a suitable collar 107, in turn carried in the upper part of the wall 63.

This shaft 105 extends rearwardly into a compartment 108 with the rear end of the shaft carried in a bearing 109 carried in a cover plate 110 secured by bolts 111 to the bolt circle surrounding the rear open edge of said compartment 108. Splined on the shaft 105 for sliding movement is a shifter hub 112 formed integrally with a large spur gear 113, the groove in the hub 112 carrying a shifter fork extension 114 of a rearwardly extending hand lever 115 pivotally carried at 116 in the cover plate 110. (See Figure 4.) This mechanism just described represents a manually controlled means for stopping operation of the pulley. In other words, the gear 113 serves as a connection for operating the pulley from the change speed gear transmission later to be described.

The rear end of the quill 79 extends rearwardly beyond its bearing 80 and rearwardly of the wall 63, or plate 77, where the rear end of said quill 79 is enlarged to form a hub 117. The rear inner face of said hub 117 is hollow to provide a space for a bearing 118 for journaling the rear end of the quill 79 on another quill, or sleeve, 119 extending substantially the full length of the shaft 72 from the front wall 63 to the rear wall 76. The outer periphery of the hub 117 is formed with a wide gear 120, the front portion of which is in mesh with a gear 121 turnable on a shaft 122 journaled in bearings, as shown in Figure 1, carried in the part 31 and the plate 77. The gear 113 heretofore described, when in mesh with the gear 121, causes the pulley to be operated when the engine clutch 82 is engaged with the flywheel 67. The multiple, variable, speed selective, gear transmission contained within the rear part of the unit 21 will next be described.

This set of gears is carried in the change speed gear compartment 123 shown in Figure 1 and located between the walls 63 and 76. This change speed gear set is of the three shaft type and has gears arranged to provide a five speed range, which five speeds are effective both in forward and reverse propulsion of the tractor. It will be seen that the main power transmission shaft is the quill 119 heretofore described. Below the quill shaft 119 the walls 76 and 77 delineating the change speed compartment 123 respectively carry bearings 124 and 125 for carrying, respectively, the rear and front ends of a power delivery shaft 126.

Keyed to the front end of the quill 119 for sliding movement thereon is an internal toothed clutch member 127 adapted to mesh with the external gear 120 heretofore described, said clutch gear 127 having formed integrally therewith a reverse speed establishing gear 128, there being a shifter fork 129 associated with the one-piece gear construction 127, 128. The sleeve shaft 119 also slidably carries a double gear 130, 131 splined to the sleeve shaft 119, which double gear includes a shifter fork 132. Similarly, the quill shaft 119 has splined thereto rearwardly of the double gear just described another double gear 133, 134, including the shifter fork 135. The rear end of said sleeve 119 has splined thereto a fifth change speed gear 136 including a shifter fork 137, the rear end of the quill or shaft 119 being carried in a bearing 138, as shown, arranged in the collar 75 heretofore described.

The front end of the power output shaft 126 is reduced at 139 and is journaled in a pair of bearings 140 carried within the hollow hub of a gear 141, which turns loosely on the bearings 140 independently of the rotation of the shaft 126. Rearwardly of this idler gear 141, the shaft 126 carries a fixed gear 142. Similarly, the shaft carries a fixed double gear 143, 144 and also a fixed double gear 145, 146. The gear 130 may be moved into engagement with the gear 142 to establish driving relationship therewith by means of a shifter rod 147, said shifter rod 147, as shown in Figure 3, being appropriately carried in a bracket 148 secured the adjacent side wall of the casing 21.

The same shifter rod 147, when moved longitudinally to the rear, carries the fork 132 with it to move the gear 131 into mesh with the gear 143. In the same manner, a shifter rod 149 may be moved in the guide bracket 148 to move the fork 135 to cause engagement of the gear 133 with the gear 144 in one direction, and, in the opposite direction, to cause engagement of the gear 134 with the gear 145. A third shifter rod 150 moves the fork 137 to engage the single gear 136 with the gear 146.

The top of this compartment 123 is open, as shown at 30 heretofore described, said opening being closed by the removable cover plate 151 to permit ready access to the gear set. Each of the shifter rods 147, 149 and 150 has associated therewith the usual spring pressed detents indicated in Figure 1 in dotted lines at 152, for releasably locking the rods and the gears associated therewith in their selected positions, as is conventional in gearing of this type. From this description it will now be seen that a five speed range is provided.

The shifter rods 147, 149 and 150, as shown in Figure 3, are respectively provided with the usual sockets 153 adapted to be engaged by the lower ball end 154 of a gear shifter lever 155 pivoted intermediate its ends by a ball mounted at 156 on a cover plate 157 mounted on one side of the rear frame part 22 rearwardly of the compartment 123.

The forward plate 77, as shown in Figure 2, carries a collar 158 for mounting a bearing 159 that carries the front end of a reverse shaft 160, the rear end of said shaft being carried in a bearing 161 appropriately carried on a wall 162 formed in the bottom of the part 21 within the compartment 123. A wide gear 163 is loosely and slidably mounted on the forward end of the shaft 160, said gear including a hub formed with a flange 164 to receive a shifter fork 165 carried on a shifter rod 166, which, as shown in Figures 2 and 3, embodies an extension having a socket 167 to receive the ball end 168 of a gear shifter lever 169, the ball mounted at 170 in the cover plate 157 heretofore described, on the opposite side from the shifter lever 155 heretofore described.

Formed integrally with the wide gear 163 is a toothed wheel part 171 adapted to serve as a dog clutch for meshing engagement with an internal toothed clutch member 172 formed as part of a wide external gear 173, which gear 173 has a hub splined on the rear end of the shaft 160, as shown in Figure 2. This wide gear 173 is always in mesh with the gear 128 on the main power quill shaft 119.

The shifter rod 166 at its front end also carries the fork 129, heretofore described, so that, when the lever 169 is operated to shift the rod 166 forwardly, the fork 129 will move the internal clutch 127 on the main shaft 119 into engagement with the dog clutch gear 120 on the quill 79. When the dog clutch 120, 127 is thus engaged, the sleeve 119 and its five gears turn. The idler gear 141 is always driven from the gear 120, said gear 141 turning loosely on the bearings 140 on the shaft 126, said gear 141 meshing with the wide gear 163 since the fork 165 was at the same time moved by the rod 166 to mesh the gears 141 and 163. The gear 163, of course, is only an idler gear and it is so wide that, when the lever 169 is moved to shift the dog clutch 171 into mesh with the complementary clutch part 172, it will cause rotation of the fast gear 173 to turn the shaft 160. The gear 173 is a reverse power transmitting gear, and it meshes with the gear 128 on the sleeve 119 to rotate said sleeve 119 and all five speed gears thereon in a reverse direction.

All five speeds provided by the gears 130, 131, 133, 134 and 136 can accordingly be made available either for forward drive or for reverse drive of the tractor in a manner that will now be readily understood.

The rear end of the power output shaft 126 of the change speed set is extended rearwardly of its bearing 124 and is enlarged, as shown in Figure 1, to form a hollow hub 174, said hub being formed on its interior with a clutch spline 175 of any appropriate form for detachably securing a power extension shaft 176 to the shaft 126, so that in operation the co-axially arranged shafts 176 and 126 operate as a single shaft. The extension 176 is appropriately journaled in bearings 177 carried in a collar 178 formed in a bearing bracket support 179 located in the space 42 and supported on the floor of the final drive frame housing part 22. The rear end of the shaft extension 176 carries a bevel pinion 180, which bevel pinion is the final power delivery gear from the change speed unit, which has just been completely described. The exterior of the hub 174 carries a suitable bearing 181 for mounting an idler gear 182 that plays down into the oil contained in the casing 22 to dip the oil and carry it upwardly for lubricating certain gearing next to be described, which gearing constitutes the operative connections from the shaft 72 for operating continuously a power take-off shaft when the motor is turning over.

As shown in Figure 1, the continuous power take-off shaft is really the main power shaft 72 rigidly connected to the motor flywheel 67. The rear end of said shaft rearwardly of the bearing 74 carries splined fast thereon a spur gear 183 meshing the idler oil dip gear 182 and also a large spur gear 184 splined fast on a shaft 185 carried in bearings 186 at its front end in the cover 157 heretofore described. As these three gears 184, 183 and 182 all mesh, it can now be seen that the oil dipper gear 182 serves to pick up the oil and distribute it over the peripheries of each of these three gears. The shaft 185 in effect is an extension of the main power shaft 72. The rear end of the shaft 185, as shown in Figure 1, is journaled in bearings 187 and the intermediate portion thereof is carried in a bearing 188 appropriately mounted in a wall extension 189, as shown. The rear end of the shaft is splined to carry a hub 190 of a one-plate disk clutch 191 having the usual opposite friction facings 192 normally pressed by a spring pressed pressure plate 193 into engagement with a plate 194 bolted by bolts 195 to the hub extension 196 of a shaft 197, which extension 196 constitutes the carrier for the bearing 187 heretofore described. The plate 194 carries the usual carrier 198 including clutch release levers 199 operable by a clutch release bearing 200 mounted in a clutch release collar 201 having trunnions 202 engaged by lever arms 203 pivoted at 204 on a shaft which is controlled by any conventional form of cam lever arrangement 205 operable by a hand lever 206. When the lever 206 is swung rearwardly, as shown in Figure 1, the cam lever 205 is operated to swing the arms 203 to slide the clutch release bearing 201 to press the clutch release levers 199 to release the pressure plate 193 to disconnect the clutch 191 from the plate 194 to stop rotation of the shaft 197.

The shaft 197 is the power take-off shaft, said shaft being extended rearwardly to the rear end of the tractor where it may be carried in a bearing, not shown. The shaft 197 thus can be made available for easy connection and disconnection with respect to auxiliary devices adapted to be driven from the power of the tractor.

It can be seen that whenever the motor is turning, the flywheel 67 causes the shaft 72 to turn to rotate the gears 183 and 184, which in turn causes rotation of the shaft extension 197 as the clutch 191 is normally spring pressed in engagement, so that the shaft 185 will turn the shaft extension 197. At the will of the operator, by means of the control lever 206, this clutch 191 can be disengaged to stop the extension shaft 197. There is thus provided what may be termed a continuous power take-off shaft operating independently of the change speed gear set and this, of course, is due to the fact that the shaft 72 can turn independently of the quill 119, which latter is the power shaft for the change speed gear set.

It will be seen that the rear end of the shaft 176 is carried in a bearing 209 mounted in a partition 210 included in the bracket 179. The bevel gear 180 heretofore described is in mesh with a bevel gear 211 made fast to a sleeve 212 arranged transversely in the frame 179 and having its opposite ends journaled in suitable bearings. The sleeve 212 serves to distribute the power to any kind of final drive gearing and shafting to drive the rear traction supports of the tractor.

This concludes the detailed description of the parts, and the manner of use and mode of operation will next be summarized.

When the motor is turning over, the flywheel 67 turns with the crank shaft 62 and, as the shaft 72 is securely attached to the flywheel 67, it also turns. The clutch 82 is normally engaged with the flywheel and, therefore, the quill 79 turns with the shaft 72. When the shift lever 155 is properly manipulated, the internal clutch 127 is meshed with the dog clutch gear 120 operatively to connect the main power shaft quill 119 with the quill 79. The quill 119 now rotates and turns the five selective change speed gears 130, 131, 133, 134, 136 therewith. This is the condition of operation of the gearing for forward propulsion of the tractor. By engaging these five gears on the quill 119 through proper manipulation of the gear shift lever 155 with the gears 142, 143, 144, 145, 146 on the shaft 126, various speeds of rotation can be delivered to the final bevel gear 180 of the change speed set.

During forward travel of the tractor, gear 117, of course, is always in mesh with the gear 141, but, since the latter is an idler gear, it merely turns loosely. The gear 121 is also constantly driven from the gear 120 and, when the lever 115 is manipulated to mesh the gear 115 with the gear 121, the pulley take-off shaft 101 is operable to turn the pulley.

For reverse driving on all five speeds of the tractor transmission, the power is delivered from the gear 120 to the idler gear 141, which in turn is always meshed with the wide gear 163 loose on the reverse countershaft 160. When the lever 169 is now manipulated to move the dog clutch gear 171 into mesh with the complementary gear part 173, the latter gear is rotated to drive the gear 128 on the quill 119 in reverse, and, as a result, the quill 119 turns in reverse and carries all five change speed gears therewith.

Thereafter, by manipulating the gear shift lever 155, all five speeds on the quill 119 can be delivered to the final bevel gear 180 in reverse.

It is intended to cover herein all changes and modifications of the preferred embodiment herein disclosed which do not depart from the spirit and scope of the invention hereinafter claimed.

What is claimed is:

1. A transmission having a longitudinal body housing including a dry compartment at its front end and a wet compartment to the rear thereof, an engine fly-wheel located in the dry compartment including a longitudinal shaft rigidly connected thereto and extending through said compartments and through a removable plate separating said compartments, a sleeve journaled in said plate for rotation about the shaft in the dry compartment, a normally engaged clutch in the dry compartment for turning the sleeve with the shaft, a second sleeve turnably carried on the shaft in the wet compartment and constituting a main drive shaft for a change speed gear set carried in the wet compartment, a jaw clutch for operatively connecting the sleeves for conjoint turning, said first shaft constituting a continuous power take-off shaft, and a second power take-off shaft driven from a gear formed with said jaw clutch.

2. A tractor having a longitudinal frame, a motor carried at the forward end of the frame and including a flywheel, a longitudinal shaft rigidly connected to the flywheel and turnable therewith, a sleeve surrounding said shaft, a releasable clutch between the sleeve and flywheel, a second sleeve surrounding the shaft, means for operatively coupling said second sleeve to the first sleeve, change speed gears carried by the second sleeve and turnable therewith, a power delivery shaft including gearing engageable by the change speed gears, a power take-off shaft driven by the first shaft, and a second power take-off shaft driven by the first sleeve and operable independently of the change speed gears.

3. A tractor having a longitudinal frame, a motor carried at the forward end of the frame and including a flywheel, a longitudinal shaft rigidly connected to the flywheel and turnable therewith, a sleeve surrounding said shaft, a releasable clutch between the sleeve and flywheel, a second sleeve surrounding the shaft, means for operatively coupling said second sleeve to the first sleeve, change speed gears carried by the second sleeve and turnable therewith, a power delivery shaft including gearing engageable by the change speed gears, a power take-off shaft driven by the first shaft, and a second power take-off shaft driven by the first sleeve, said releasable clutch permitting operation of the first power take-off shaft independently of the change speed gears and the second power take-off shaft, and said coupling means permitting operation of the second power take-off shaft independently of the change speed gears.

4. In a tractor having a longitudinal frame and a motor carried at the forward end of the frame, said motor including a flywheel, the combination with the motor of transmission mechanism carried by the frame rearwardly of the motor and including a rearwardly extending shaft rigidly connected to the flywheel for continuous rotation therewith, a sleeve surrounding said shaft and including means for connecting and disconnecting said sleeve to and from the flywheel for rotation with or independently of the shaft, a power take-off shaft, a second power take-off shaft, and change speed gearing, said first power take-off shaft being driven by the shaft and said change speed gearing and the second power take-off shaft being driven by the sleeve, the aforesaid means on the sleeve permitting disconnection of the change speed gearing and the second power take-off shaft without interfering with the operation of the first power take-off shaft.

5. In a tractor having a longitudinal frame and a motor carried at the forward end thereof, said motor including a flywheel, the combination with the motor of a longitudinal, rearwardly extending shaft connected to the flywheel for continuous rotation therewith, a sleeve surrounding said shaft, a releasable clutch for connecting the sleeve to the flywheel, a gear carried on said sleeve for rotation therewith, a second sleeve surrounding said shaft and including disconnectable means thereon for connection with the gear on the first sleeve, change speed gearing driven in one direction by said second sleeve when connected with the first sleeve gear, and reverse gearing including disconnectable means adapted to be connected to the first sleeve gear and to the change speed gearing for reversing the direction of the change speed gearing, each of said disconnectable means and the aforesaid clutch being operable without interfering with continuous operation of the aforesaid shaft.

6. In a tractor having a longitudinal frame and a motor carried at the forward end thereof, said motor including a flywheel, the combination with the motor of a longitudinal, rearwardly extending shaft connected to the flywheel for continuous rotation therewith, a sleeve surrounding said shaft, a releasable clutch for connecting the sleeve to the flywheel, a gear carried on said sleeve for rotation therewith, a second sleeve surrounding said shaft and including disconnectible means thereon for connection with the gear on the first sleeve, change speed gearing driven in one direction by said second sleeve when connected with the first sleeve gear, and reverse gearing including disconnectable means adapted to be connected to the first sleeve gear and to the change speed gearing for reversing the direction of the change speed gearing, a power take-off shaft driven by the first shaft, and a second power take-off shaft driven from the first sleeve gear, each of said disconnectable means and the clutch being operable without interfering with the continuous rotation of the first shaft, each of said disconnectable means being also operable without interfering with operation of the second power take-off shaft.

7. In a tractor having a longitudinal frame and a motor carried at the forward end thereof, said motor including a flywheel, the combination with the motor of a longitudinal, rearwardly extending shaft connected to the flywheel for continuous rotation therewith, a sleeve surrounding said shaft, a releasable clutch for connecting the sleeve to the flywheel, a gear carried on said sleeve for rotation therewith, a second sleeve surrounding said shaft and including disconnectable means thereon for connection with the first sleeve gear, change speed gearing driven in one direction by said second sleeve when connected with the first sleeve gear, reverse gearing including a gear in constant mesh with the first sleeve gear and disconnectable means adapted to establish driving engagement between the first sleeve and the change speed gearing for reversing the change speed gearing, a power take-off shaft driven by the first shaft, and a second power take-off shaft driven by the first sleeve gear and including a gear in constant mesh with said gear, each of said disconnectable means and the clutch being operable without interfering with continuous operation of the first shaft, each disconnectable means being also operable without interfering with operation of the second power take-off shaft.

8. A tractor having a longitudinal frame, a motor carried at the forward end of the frame and including a flywheel, a longitudinal shaft rigidly connected to the flywheel and continuously turnable therewith, a sleeve surrounding said shaft and including a gear, a releasable clutch between the sleeve and flywheel, a second sleeve surrounding the shaft, means on the second sleeve cooperable with the gear on the first sleeve for operatively coupling said sleeves, change speed gears carried by the second sleeve and turnable therewith, a power take-off shaft driven from the first sleeve and including a gear in constant mesh with said first sleeve gear, the aforesaid coupling means being operable without interfering with the operation of said power take-off shaft or with the continuous operation of the first shaft.

9. A tractor having a longitudinal frame, a motor carried at the forward end of the frame and including a flywheel, a longitudinal shaft rigidly connected to the flywheel and turnable therewith, a sleeve surrounding said shaft, a releasable clutch between the sleeve and flywheel, a second sleeve surrounding the shaft, change speed gears carried by said second sleeve and turnable therewith, power delivery gearing engageable with the change speed gears, means for coupling the second sleeve to the first sleeve to drive the change speed gears and power delivery gearing in one speed range, and a second means for coupling the change speed gearing to the first sleeve in a different speed range, said shaft constituting a power take-off shaft driven continuously from the motor independently of the operation of the sleeves and change speed gears.

EDWARD A. JOHNSTON.
DAVID B. BAKER.
CLIFFORD R. ROGERS.